United States Patent
Huchin et al.

(10) Patent No.: US 10,618,106 B2
(45) Date of Patent: Apr. 14, 2020

(54) CORE FOR CASTING A BLADE OF A TURBOMACHINE

(71) Applicants: SAFRAN AIRCRAFT ENGINES, Paris (FR); SAFRAN, Paris (FR)

(72) Inventors: Patrick Emilien Paul Emile Huchin, Tessancourt sur Aubette (FR); Matthieu Jean Luc Vollebregt, Asnieres sur Seine (FR); Adrien Bernard Vincent Rollinger, Joinville-le-Pont (FR); Mirna Bechelany, Courbevoie (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/080,377

(22) PCT Filed: Feb. 27, 2017

(86) PCT No.: PCT/FR2017/050423
§ 371 (c)(1),
(2) Date: Aug. 28, 2018

(87) PCT Pub. No.: WO2017/149229
PCT Pub. Date: Sep. 8, 2017

(65) Prior Publication Data
US 2019/0099803 A1    Apr. 4, 2019

(30) Foreign Application Priority Data
Mar. 1, 2016 (FR) ..................... 16 51700

(51) Int. Cl.
*B22C 9/10* (2006.01)
*F01D 5/18* (2006.01)
*F01D 5/20* (2006.01)

(52) U.S. Cl.
CPC .............. *B22C 9/103* (2013.01); *F01D 5/187* (2013.01); *F01D 5/20* (2013.01);
(Continued)

(58) Field of Classification Search
CPC ............ B22C 9/10; B22C 9/103; B22C 9/108
(Continued)

(56) References Cited

U.S. PATENT DOCUMENTS 3,401,738 A * 9/1968 Parille .................... B22C 9/04
164/353
7,562,691 B2 * 7/2009 Guerche et al. ........ B22C 9/103
164/28

(Continued)

FOREIGN PATENT DOCUMENTS

| EP | 1637253 A1 | 3/2006 |
|---|---|---|
| EP | 2071126 A2 | 6/2009 |

(Continued)

OTHER PUBLICATIONS

International Search Report for International Application No. PCT/FR2017/050423 dated May 23, 2017.
(Continued)

*Primary Examiner* — Kevin P Kerns
(74) *Attorney, Agent, or Firm* — Pearne & Gordon LLP

(57) ABSTRACT

A core for casting a blade of a turbomachine, the core including a first part for defining a first cavity and a second part of which at least one portion defines a second cavity located between the first cavity and the tip of the blade. The portion of the second part includes a through-hole that ends opposite the first part so as to define, in the cast blade, an outer face of a duct for removing dust from the first cavity. An alumina pin which is secured to the end face of the first part extends into the through-hole to define the inner face of the duct. A centering sheath placed between the pin and the
(Continued)

through-hole centers the pin in relation to the through-hole. The centering sheath is made of a material that is intended to dissolve before the blade is cast around the core.

7 Claims, 3 Drawing Sheets

(52) U.S. Cl.
CPC .. *F05D 2230/211* (2013.01); *F05D 2240/307* (2013.01); *F05D 2260/607* (2013.01); *Y02T 50/675* (2013.01)

(58) Field of Classification Search
USPC .......................................... 164/28, 30, 369
See application file for complete search history.

(56) References Cited

U.S. PATENT DOCUMENTS

| | | | | |
|---|---|---|---|---|
| 7,931,459 | B2* | 4/2011 | Louesdon et al. | B22C 13/16 164/228 |
| 2014/0290891 | A1* | 10/2014 | Wilburn et al. | B22C 9/108 164/4.1 |
| 2015/0122445 | A1* | 5/2015 | Truelle et al. | F01D 5/20 164/15 |
| 2016/0375610 | A1 | 12/2016 | Vollebregt et al. | |
| 2018/0193920 | A1 | 7/2018 | Vollebregt et al. | |

FOREIGN PATENT DOCUMENTS

| | | |
|---|---|---|
| FR | 2986982 A1 | 8/2013 |
| WO | 2013093352 A2 | 6/2013 |
| WO | 2013167847 A2 | 11/2013 |

OTHER PUBLICATIONS

Written Opinion for International Application No. PCT/FR2017/050423 dated May 23, 2017.
French Search Report issued in Patent Application No. FR 16 51700 dated Sep. 13, 2016.
Application document as-tiled for patent application entitled: Unit for Moulding a Turbomachine Blade, Comprising a Raised Portion With a Large Cross-Section, U.S. Appl. No. 15/740,693, filed Dec. 28, 2017.
Application document as-filed for patent application entitled: Cooled Turbine Vane, U.S. Appl. No. 16/083,026, filed Sep. 7, 2018.

* cited by examiner

CORE FOR CASTING A BLADE OF A TURBOMACHINE

This is a National Stage application of PCT international application PCT/FR2017/050423, filed on Feb. 27, 2017, which claims the priority of French Patent Application No. 16 51700 filed Mar. 1, 2016, both of which are incorporated herein by reference in their entirety.

TECHNICAL FIELD

The invention relates to the production of a turbine engine type aircraft engine blade, such as a turbojet or a turboprop.

PRIOR ART

In such a turbojet type engine, referenced by 1 in FIG. 1, air is taken in, in an inlet sleeve 2 to cross a blower comprising a series of rotating blades 3 before being split into a central primary flow and a secondary flow surrounding the primary flow.

The primary flow is compressed by the low-pressure 4 and high-pressure 6 compressors, before reaching a combustion chamber 7, after which it expands by crossing the turbines 8, before being released by generating a thrust. The secondary flow itself is propelled directly by the blower to generate an additional thrust.

Each turbine 8 comprises series of blades oriented radially and regularly spaced around a rotating shaft AX, an outer casing 9 surrounding the engine unit.

The cooling of the blades is ensured by making the air removed upstream of the combustion and taken in at the base of the blade, circulate in each blade, this air being released by bores crossing the walls of these blades.

Such a blade, which is referenced by 11 in FIG. 2, comprises a base P by which it is fixed to a rotating body, and a blade 12 supported by this base P, a platform 13 being situated at the level of the connection of the base and the blade.

The blade 12 has a non-straight shape, spiralled around an axis EV referred to as spanwise axis, which is perpendicular to the axis AX. It comprises a base by which it is connected to the platform 13 and which extends radially up to a peak S which is the free end of this blade. The two main walls of the blade are the upper wall 14 thereof and the lower wall thereof, which cannot be seen in FIG. 2, which are spaced from each other in the current portion thereof, and which are joined together at the level of the trailing edge 15.

The peak S of the blade 11 comprises a wall, closing perpendicularly to the direction EV, and which connects the upper and lower walls. This closing wall that cannot be seen in FIG. 2 is recessed towards the axis AX with respect to the free edges of the upper and lower walls. It delimits together with these edges, a hollow portion, open in the direction opposite the axis AX, called a bath, represented schematically by discontinuous lines and marked with B, which is situated at the top of the blade, in other words, at the level of the peak thereof.

The increased performance needs lead to optimising the cooling of the blade, which is ensured by circulation of air in the cavities and inner channels of this blade. This optimisation leads to multiplying the number of cavities and inner channels, which leads to overlapping geometric shapes which could be complex.

In order to ensure that the cooling cannot be damaged, each inner cavity is connected to the outside by at least one dust removal hole to release possible dust such that it does not block the circulation of air.

The aim of the invention is to provide a production method enabling to produce a large variety of inner cavities, while ensuring the dust removal thereof.

DESCRIPTION OF THE INVENTION

To this end, the invention aims for a core for the moulding of a turbine engine blade, this blade comprising a blade extending along a spanwise direction and ending with a peak, this core comprising a first core element to delimit a first inner cavity and a second core element of which at least one portion delimits a second inner cavity of the blade, these core elements being rigidly connected to each other, the second cavity being situated between the first cavity and the peak of the blade along the spanwise direction, and wherein:
  the portion of the second core element which delimits the second cavity comprises a through bore oriented along the spanwise direction, and which leads to the right of an end face of the first core element to delimit in the moulded blade, an outer face of a dust removal conduit of the first cavity, this conduit crossing the second cavity from one end to the other, leading to the peak of the blade;
  an alumina rod with a diameter less than the diameter of the through bore, and extending inside the through bore by being fixed to the end face of the first core element, to delimit the inner face of the dust removal conduit;
  centring means interposed between the rod and the through bore to centre this rod with respect to the hole, these centring means being made of a material intended to be dissolved before proceeding with casting the blade around said core.

With this arrangement, the position and the orientation of the rod and of the through bore are directly coupled, such that the hole and the rod are necessarily optimally coaxial. The dust removal conduit delimited by this hole and this rod thus necessarily has a sufficient and regular thickness. This arrangement thus enables to form a dust removal conduit crossing a cavity, to remove dust from another cavity or channel covered by the cavity crossed by this conduit.

The invention also aims for a core thus defined, wherein the centring means are formed by a sheath surrounding the rod over at least one portion of length of this rod.

The invention also aims for a core thus defined, wherein the sheath is made of an organic polymer type material.

The invention also aims for a core thus defined, wherein the through bore is situated in a central region of the portion of the second core element which delimits the second cavity, to be spaced from each side face of this core element, in order to constitute in the ended blade, an obstacle splitting the air circulating in the second cavity into two side flows.

The invention also aims for a core thus defined, comprising a through bore which borders a side face of the portion of the second core element delimiting the second cavity, by being open in this side face, in order to constitute a conduit bordering inside a side wall of the blade, in the ended blade.

The invention also aims for a core thus defined, wherein the first core element is arranged to delimit a cooling channel of a trailing edge of the blade, and wherein the second core element is arranged to delimit an under-bath cavity of the blade.

The invention also aims for a method for producing a core thus defined, comprising a step of positioning the rod with the sheath thereof in a moulding unit by injecting the core elements, and a step of injecting the core elements into the moulding unit when the rod is in place in this unit.

The invention also relates to a turbine engine blade obtained with the core thus defined.

The invention also relates to a turbine engine comprising a blade thus defined.

DETAILED DESCRIPTION OF SPECIFIC EMBODIMENTS

The basis of the invention is to provide an under-bath cavity situated between the bath bottom and the end of a cooling channel of the trailing edge of the blade, supplied by a channel and crossed by a dust removal conduit of the cooling channel of the trailing edge.

The dust removal conduit crosses the under-bath cavity by leading to the bottom of the bath to remove dust from the cooling channel of the trailing edge.

This under-bath cavity effectively cools the blade peak that constitutes the bottom of the bath, while enabling, using the conduit which crosses it, the dust removal, separate from the cooling channel of the trailing edge of which it covers the end.

Figure 1:
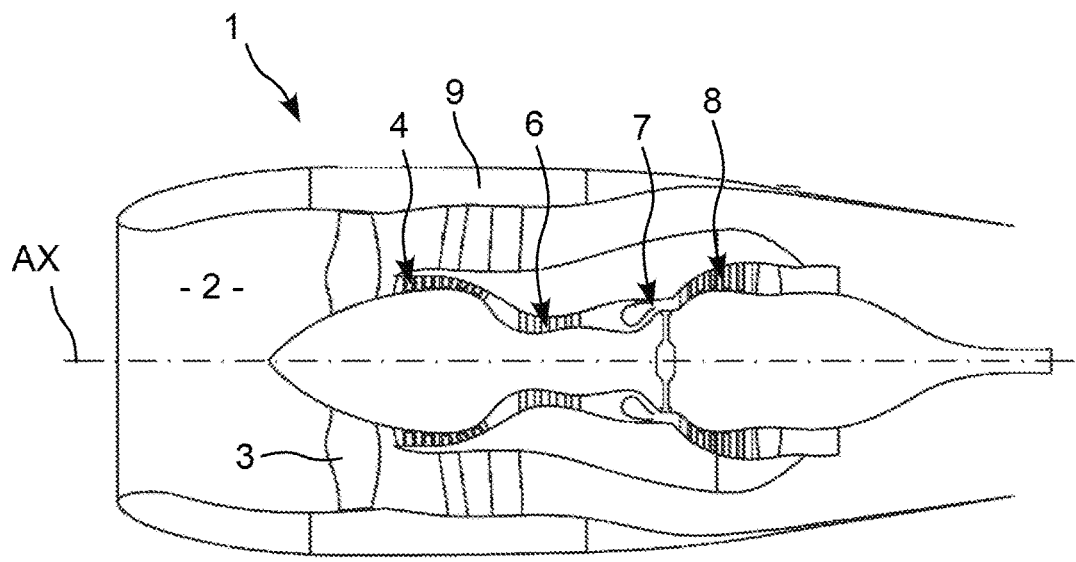
FIG. 1 already defined is an overview of a double flow turbojet represented as a cross-section along a longitudinal cross-section plane.
Figure 2:
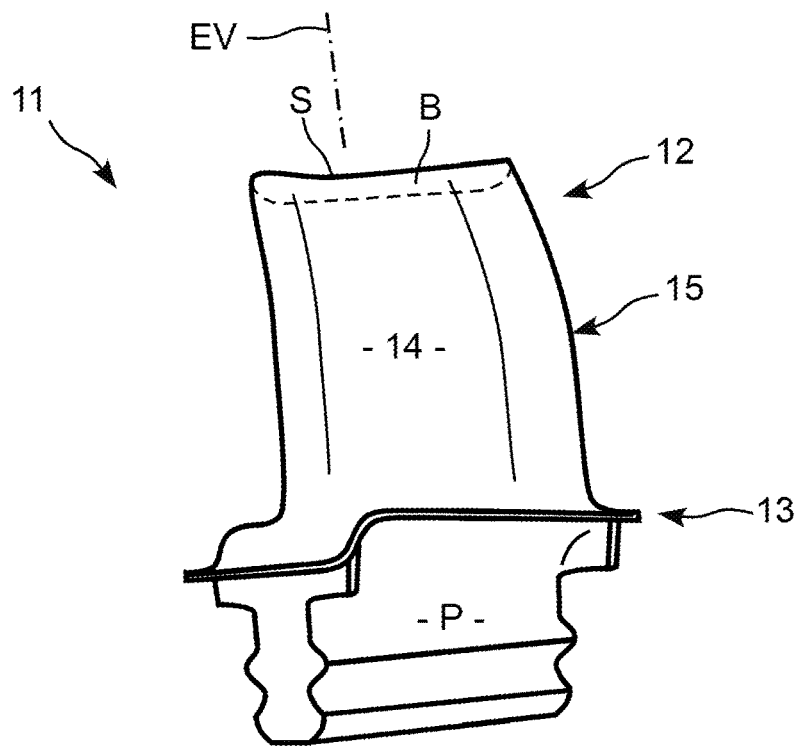
FIG. 2 already defined is an overview of a turbojet blade.
Figure 3:
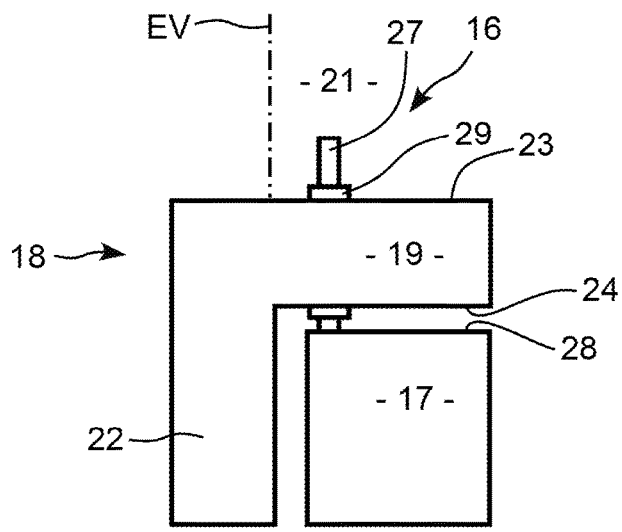
FIG. 3 is a schematic representation of a part of a core according to the invention with the alumina rod thereof and the centring sheath thereof.
Figure 4:
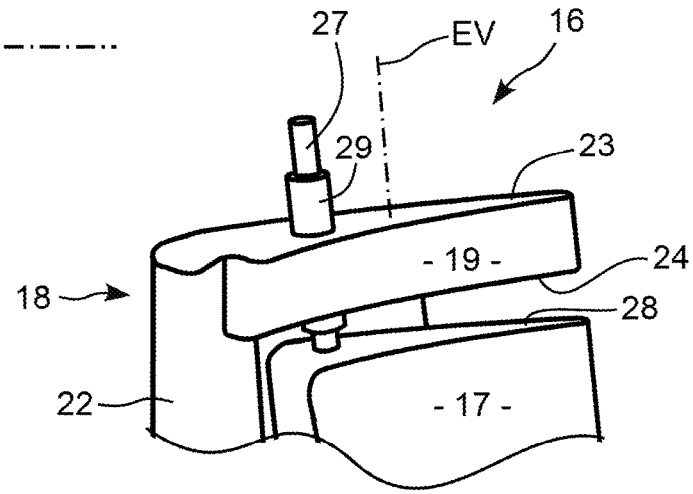
FIG. 4 is a perspective view of a core according to the invention with the alumina rod thereof and centring sheath thereof.

As can be seen in FIGS. 3 and 4, a core 16 according to the invention to produce a blade comprising an under-bath cavity covering the end of a cooling channel of the trailing edge thereof, comprises a downstream core element 17, and an upstream core element 18. The downstream core element 17 delimits the cooling channel, and the upstream core element 18 delimits the under-bath cavity.

As will have been understood, the terms upstream and downstream are used with respect to the flow of fluid in the turbojet, in particular around the moulded blade in service.

The downstream element 17 has a generally elongated shape which extends along a spanwise direction EV of the blade of this blade, from the base thereof up to a region close to the peak thereof.

The upstream element 18 comprises an upper portion 19 extending between the end of the downstream core 17 and the placement 21 of a bath, not represented, which is situated at the blade peak. This element 18 thus delimits the under-bath cavity and a portion 22 for supplying this under-bath cavity, this supply portion 22 extending along the spanwise direction EV, perpendicularly to the upper portion 19.

As can be seen in FIGS. 3 and 4, the supply portion 22 is situated upstream of the downstream element 17 with respect to the flow direction of the fluid, the under-bath cavity being supplied with dedicated cooling air that delimits this portion 22. The under-bath cavity in fact receives fresh air to effectively cool the bottom of the bath, in other words, the peak of the blade.

The portion 19 of the upstream core element, which is spaced from the free end of the downstream core element 17 along the spanwise axis EV comprises an upper face 23 and a lower face 24, opposite, along the spanwise direction and substantially normal orientation to this axis.

The face 24 corresponds, once the blade is moulded, to the lower face of the bottom of the bath situated at the placement 21, and the face 23 corresponds to that which is opposite the face delimiting the free end of the downstream core element 17.

Figure 5:
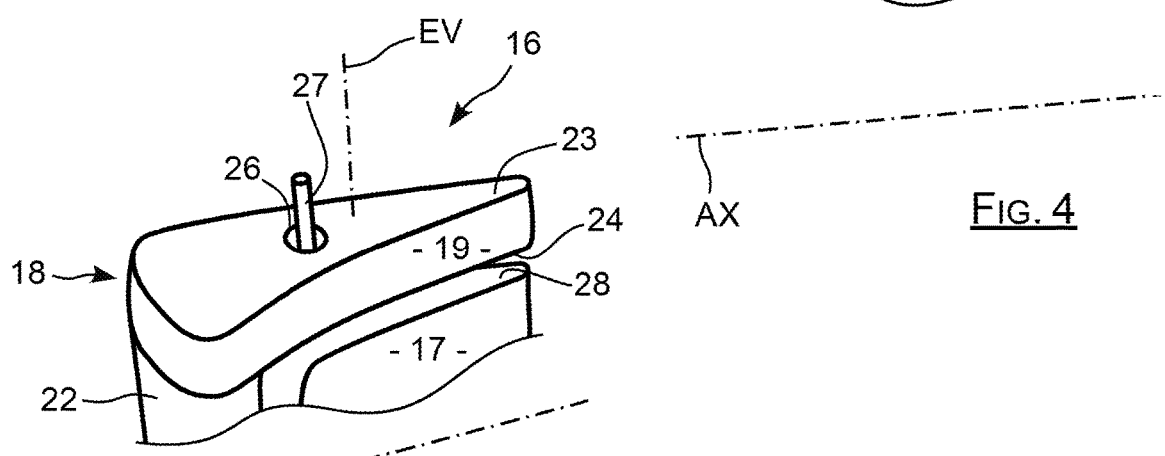
FIG. 5 is another perspective view of a core according to the invention with the alumina rod thereof once the centring sheath has been removed.

The portion 19 of the upstream core element 18 is crossed by a hole 26, that can be seen in FIG. 5, of which the orientation corresponds substantially to that of the spanwise direction EV, to put the upper 23 and lower 24 faces of this portion 19 in communication.

The hole 26 delimits, in the moulded blade, the outer cylindrical face of a tubular conduit directly putting the downstream channel that delimits the core element 17, in communication with the bath bottom, in other words, the peak of the blade.

The inner cylindrical face of this conduit is delimited by an alumina rod 27 supported by the core by being particularly fixed or embedded in the upper face 28 of the element 17. This upper face 28 is the end face of the element 17: it is situated opposite the lower face 24 of the portion 19.

The dust removal conduit of the downstream channel of the blade, once it has been formed, thus has a generally tubular shape delimited by an outer face and an inner face, both cylindrical and coaxial.

According to the invention, the coaxiality of the cylindrical outer and inner faces, ensuring that the conduit has a sufficient thickness at all points, is improved by directly centring the alumina rod 27 in the hole 26 using a tubular sheath 29 which is supported by the rod 27. The inner diameter of this sheath 29 corresponds to the outer diameter of the rod, and the outer diameter of this sheath corresponds to the inner diameter of the hole 26.

During the production of the core 16, the rod 27 with the sheath 29 that it supports is placed and held in position in a moulding unit by injecting the core 16. This rod 27 is thus held, for example, by the end thereof opposite the end of this rod 27 being embedded in the upper face 28 of the core element 17.

The injection of the elements 17 and 18 of the core 16 is thus triggered, which thus forms these elements, while embedding an end of the rod 27 in the upper face of the element 17 and by forming the hole 26 in the portion 19, around the sheath 29.

Under these conditions, the rod 27 is necessarily ideally centred with respect to the hole 26, since it has been formed around the sheath 29. Thus, in case of substantial difference of the rod with respect to the ideal position thereof when it is implemented prior to injecting, this difference has no impact on the centring thereof with respect to the hole 26 which surrounds it. A difference in the positioning of the rod cannot therefore lead to a reduction in the thickness of conduit by place, which avoids a rejection of the blade for this reason.

The centring sheath 29 is made of a material provided to be destroyed before using the core to mould the blade. This destruction is ensured, for example, with a degradation or chemical attack method, or with a thermal degradation method, for example, by fusion.

In other words, the centring sheath 29 which is used to centre the rod 27 in the hole 26 to produce the core is removed before the actual implementation of this core to constitute a blade.

The composition of the coating material forming the sheath 29 mainly comprises an organic polymer. This sheath 29 can be returned onto the rod by an additive method, by injection, by machining a block, or any other suitable method.

Moreover, in the example above, the core portion 19 is formed by injection around the sheath 29, during an injection operation, wherein the core element 17 is also formed. But other implementations of the invention are also possible.

In particular, the core 18 can be produced with the portion 19 thereof in a prior operation, here forming the hole 26 thereof. The rod 27 with the sheath 29 thereof is thus inserted in the hole 26 formed in the portion 19. These components are thus implemented in a moulding unit for injecting the first core 17 wherein the end of the rod 27 is embedded.

Such that the rod 27 does not risk being excessively off-centred during operations carried out after removing the sheath 29, like debinding or sintering operations likely to move the components forming the core, several measures can be provided.

The sheath 29 can be sized with a sufficient thickness such that the possible movements cannot lead to a too-low thickness of the conduit. Core compositions can also be used which reduce the movements: for example, the use of thermosettable polymers in the ceramic composition of the core enables to remove such movements. In addition, an advantage of said thermosettable polymer with the ceramic is the stability during the removal of the sheath, for example, by heating the latter.

The space which is delimited by the hole 26 and by the rod 27, after removing the sheath 29, thus enables to directly delimit, during the moulding operation of the blade, any tubular dust removal conduit crossing the under-bath cavity.

Figure 6:
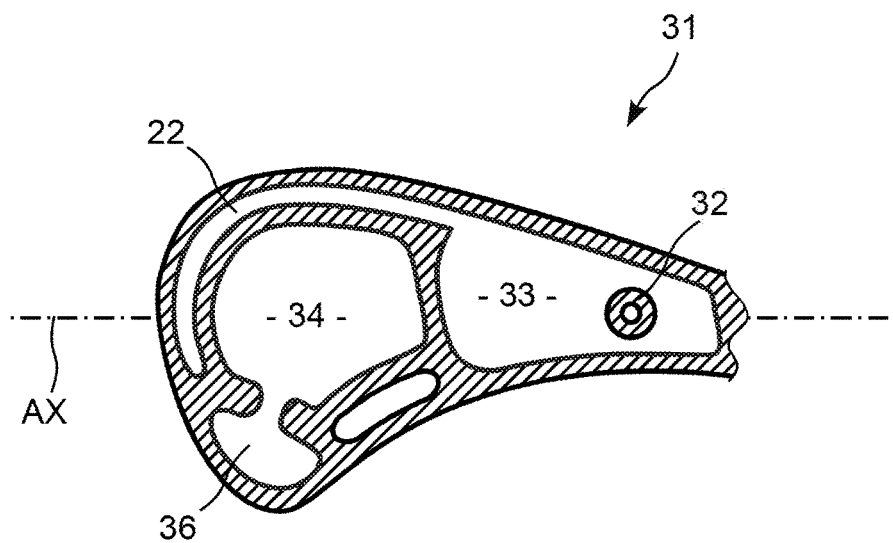
FIG. 6 is a cross-section view along a plane transverse to the spanwise direction of a blade obtained with the core according to the invention.

In the moulded blade thus obtained, which can be seen in FIG. 6, where it is referenced by 31, the dust removal conduit which is referenced by 32, crosses from one end to the other, the under-bath cavity referenced by 33 and delimited by the portion 19 of the core element 18.

This conduit 32 can thus, as in the example of FIG. 6, be centred in the under-bath cavity 33, to further form in this cavity, a central obstacle which splits the air flow into two halves, bordering each one of the side faces of this cavity 33. This increases the effectiveness of the cooling.

It will be noted, that in the cross-section view that constitutes FIG. 6, the conduit situated under the under-bath cavity and delimited by the core element 17, does not appear, given the orientation of this view. Moreover, this view is that of a blade having a substantially different shape from that formed with the core in FIG. 4 or 5. Thus, this view relates to a blade further comprising another channel 34 for supplying an upstream pad 36 dedicated to the cooling of the leading edge of this blade.

Figure 7:
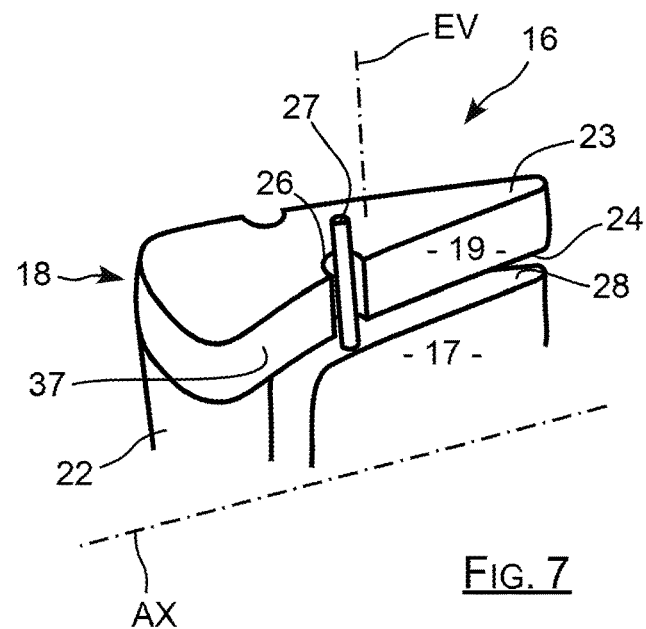
FIG. 7 is a perspective view of a core variant according to the invention with the alumina rod thereof once the centring sheath has been removed.
Figure 8:
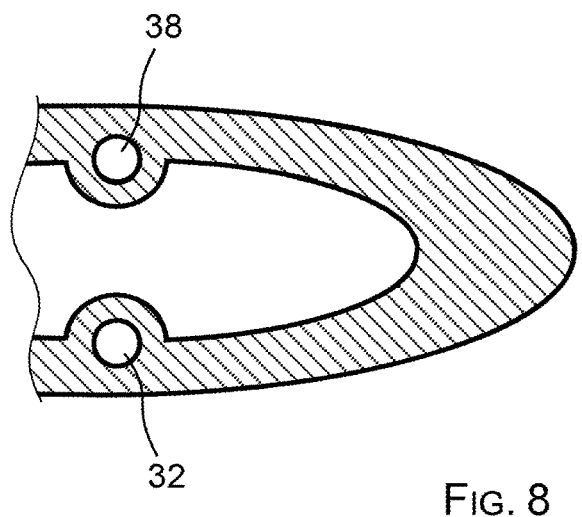
FIG. 8 is a cross-section view along a plane transverse to the spanwise direction of a blade obtained with the core variant according to the invention.

Moreover, the through bore 26 which extends into the central part of the under-bath cavity in the embodiment in FIGS. 4 to 6, can also be laterally moved, as illustrated in the variant in FIGS. 7 and 8.

In this case, the hole 26 extends from the upper face 23 to the lower face 24 of the portion 19 of the core element 18, but by bordering a side face 37 of this core, which here delimits the inner face of the upper wall of the blade.

As represented in FIG. 7, the hole 26 can thus both extend from the face 23 to the face 24 wherein it leads, while being open over the whole of the height thereof, to the side face 37, this hole 26 thus having a groove shape formed in the face 37 of the portion 19 and extending parallel to the direction EV.

Under these conditions, the dust removal conduit delimited by this hole 26, crosses the second cavity from one end to the other, while bordering the upper wall, as illustrated in FIG. 8, where this side conduit is referenced by 32.

Similarly, another hole 38 can be formed along the face opposite the portion 19, namely that delimiting the inner face of the lower wall of the blade, to delimit another conduit of the same type, but which borders the lower wall, as schematically illustrated in FIG. 8, where this other conduit is referenced by 38.

What is claimed is:

1. Core (16) for moulding of a turbine engine blade, this blade comprising a blade extending along a spanwise direction (EV) and ending with a peak, this core (16) comprising a first core element (17) to delimit a first inner cavity of the blade and a second core element (18) of which at least one portion (19) delimits a second inner cavity of the blade, these core elements (17, 18) being rigidly connected to each other, the second cavity being situated between the first cavity and the peak of the blade along the spanwise direction (EV), and wherein:

the at least one portion (19) of the second core element (18) which delimits the second cavity comprises a through bore (26) oriented along the spanwise direction (EV), and which leads to the right of an end face (28) of the first core element (17) to delimit in the moulded blade, an outer face of a dust removal conduit (32) of the first cavity, this conduit (32) crossing the second cavity from one end to the other by leading to the peak of the blade;

an alumina rod (27) with a diameter less than the diameter of the through bore (26), and extending inside the through bore (26) by being fixed to the end face (28) of the first core element (17), to delimit the inner face of the conduit (32);

centring means (29) interposed between the rod (27) and the through bore (26) to centre this rod with respect to the bore (26), these centring means (29) being made of a material intended to be dissolved before proceeding with casting the blade around said core (16).

2. Core (16) according to claim 1, wherein the centring means (29) are formed by a sheath surrounding the rod (27) over at least one portion of length of this rod (27).

3. Core (16) according to claim 2, wherein the sheath (29) is made of an organic polymer material.

4. Core (16) according to claim 1, wherein the through bore (26) is situated in a central region of the at least one portion (19) of the second core element (18) which delimits the second cavity, to be spaced from each side face of this core element (18) in order to constitute in the blade, an obstacle splitting the air circulating in the second cavity into two side flows.

5. Core (16) according to claim 1, comprising a through bore (26) which borders a side face (37) of the at least one portion (19) of the second core element (18) delimiting the second cavity, by being open in this side face (37), in order to constitute a conduit bordering inside a side wall of the blade, in the blade.

6. Core (16) according to claim 1, wherein the first core element (17) is arranged to delimit a cooling channel of a trailing edge of the blade, and wherein the second core element (18) is arranged to delimit an under-bath cavity of the blade.

7. Method for producing a core (16) according to claim 2, comprising a step of positioning the rod (27) with the sheath (29) thereof in a moulding unit by injecting the core elements (17, 18), and a step of injecting the core elements (17, 18) into the moulding unit when the rod (27) is in place in this unit.

* * * * *